United States Patent
Watanabe et al.

(10) Patent No.: US 9,494,149 B2
(45) Date of Patent: Nov. 15, 2016

(54) INVERTER-INTEGRATED ELECTRIC COMPRESSOR

(75) Inventors: Takayuki Watanabe, Aichi (JP); Takeshi Hirano, Aichi (JP); Makoto Hattori, Aichi (JP); Kazuki Niwa, Aichi (JP); Takashi Nakagami, Aichi (JP); Koji Toyama, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1490 days.

(21) Appl. No.: 12/746,847

(22) PCT Filed: May 13, 2009

(86) PCT No.: PCT/JP2009/058926
§ 371 (c)(1),
(2), (4) Date: Aug. 16, 2010

(87) PCT Pub. No.: WO2009/139416
PCT Pub. Date: Nov. 19, 2009

(65) Prior Publication Data
US 2010/0303648 A1 Dec. 2, 2010

(30) Foreign Application Priority Data
May 14, 2008 (JP) ................................ 2008-127703

(51) Int. Cl.
*F04B 39/00* (2006.01)
*F04B 39/12* (2006.01)

(52) U.S. Cl.
CPC ............. *F04B 39/121* (2013.01); *H02K 11/01* (2016.01); *H02K 11/33* (2016.01); *F04B 2203/0204* (2013.01)

(58) Field of Classification Search
CPC ...... F04B 39/121; H02K 11/01; H02K 11/33

USPC ......... 417/410.1, 423.14, 411; 310/68 R, 72, 310/71, 89
See application file for complete search history.

(56) References Cited

U.S. PATENT DOCUMENTS 4,172,964 A * 10/1979 Reinebach ...................... 178/46
4,963,778 A * 10/1990 Jensen et al. ............... 310/68 D (Continued)

FOREIGN PATENT DOCUMENTS

| JP | 8-250654 A | 9/1996 |
|----|------------|--------|
| JP | 8-250854 A | 9/1996 |

(Continued)

OTHER PUBLICATIONS

Machine Translation of JP 2004-225580.*

(Continued)

*Primary Examiner* — Charles Freay
*Assistant Examiner* — Christopher Bobish
(74) *Attorney, Agent, or Firm* — Westerman, Hattori, Daniels & Adrian, LLP (57) ABSTRACT

In an inverter-integrated electric compressor (1) provided with an inverter accommodating section (9) on the periphery of a housing (2) and an inverter (20) provided therein, the inverter accommodating section (9) is divided into a first accommodating section (9) accommodating an inverter module (21) equipped with a power system board on which semiconductor switching devices etc. are mounted and a CPU board on which a control and communication circuit etc. are mounted, and a second accommodating section (40) accommodating high-voltage-system components (30), such as a common-mode coil (35), a normal-mode coil (36), and a smoothing capacitor (37), provided on a high-voltage line (34) for supplying DC power from a high-voltage power supply to the inverter module (21), the accommodating sections (9) and (40) being separately provided on the periphery of the housing (2).

18 Claims, 9 Drawing Sheets

(56) References Cited

U.S. PATENT DOCUMENTS

| | | | |
|---|---|---|---|
| 6,336,063 B1* | 1/2002 | Lennevi | B60K 6/28 180/65.1 |
| 6,354,674 B1* | 3/2002 | Iwamoto et al. | 303/119.3 |
| 6,564,576 B2* | 5/2003 | Shibuya | 62/505 |
| 6,875,029 B2* | 4/2005 | Kawabata et al. | 439/76.2 |
| 7,207,187 B2 | 4/2007 | Funahashi et al. | 62/228.4 |
| 7,514,829 B2* | 4/2009 | Otsuji et al. | 310/71 |
| 7,621,367 B2* | 11/2009 | Tominaga et al. | 180/444 |
| 7,972,123 B2* | 7/2011 | Koide et al. | 417/411 |
| 7,989,997 B2* | 8/2011 | Hashimoto et al. | 310/68 D |
| 8,118,564 B2* | 2/2012 | Enami et al. | 417/44.1 |
| 2003/0200761 A1* | 10/2003 | Funahashi et al. | 62/228.4 |
| 2004/0025525 A1* | 2/2004 | Kubo et al. | 62/230 |
| 2004/0222767 A1* | 11/2004 | Ohkouchi et al. | 318/801 |
| 2005/0092534 A1* | 5/2005 | Hobmeyr et al. | 180/65.3 |
| 2005/0167183 A1* | 8/2005 | Tominaga et al. | 180/444 |
| 2005/0268632 A1* | 12/2005 | Yonekura et al. | 62/236 |
| 2008/0284367 A1* | 11/2008 | Kawashima et al. | 318/700 |

FOREIGN PATENT DOCUMENTS

| | | | |
|---|---|---|---|
| JP | 10-304679 A | | 11/1998 |
| JP | 2003-322082 A | | 11/2003 |
| JP | 2004-190547 A | | 7/2004 |
| JP | 2004225580 | * | 8/2004 |
| JP | 2005-161940 A | | 6/2005 |
| JP | 3827158 B2 | | 9/2006 |
| JP | 2006-316755 A | | 11/2006 |

OTHER PUBLICATIONS

International Search Report of PCT/JP2009/058926, Mailing Date of Jun. 16, 2009.

A Decision to Grant a Patent was issued on Sep. 11, 2012, for Japanese Patent Application No. 2008-127703 (3 pages).

Decision to Grant a Patent dated Jul. 15, 2014, issued in corresponding Japanese Patent Application No. 2012-225674, Explanation of Relevancy—"Decision to Grant a Patent has been received" (3 pages).

* cited by examiner

INVERTER-INTEGRATED ELECTRIC COMPRESSOR

TECHNICAL FIELD

The present invention relates to an inverter-integrated electric compressor suitable for a compressor of a vehicle air conditioner in which an inverter is integrated on the periphery of a housing accommodating an electric motor and a compression mechanism.

BACKGROUND ART

Various inverter-integrated electric compressors with which an inverter is integrated have recently been proposed as compressors for air conditioners installed in vehicles. These inverter-integrated electric compressors are configured such that an inverter accommodating section (an inverter box, a case, an outer frame, or the like) is provided on the periphery of a housing that accommodates an electric motor and a compression mechanism, and an inverter that converts DC power supplied from a high-voltage power supply to three-phase AC power and feeds the three-phase AC power to the electric motor through glass-sealed terminals is installed in the inverter accommodating section, so that the rotational speed of the compressor can be variably controlled in accordance with the air conditioning load.

The inverter includes an inverter circuit section composed of a power system board (including a base, a unit base, etc.) on which a plurality of semiconductor switching devices (for example, IGBTs) that convert DC power to three-phase AC power are mounted and a CPU board (printed board) on which a control and communication circuit having a device that operates at low voltage, such as a CPU, is mounted; and high-voltage-system components, such as an inductor coil and a smoothing capacitor, which are provided on a high-voltage line for supplying DC power supplied from the high-voltage power supply to the inverter circuit section to reduce the switching noise and current ripples of the inverter.

In such inverter-integrated electric compressors, the inverter circuit section and the high-voltage-system components that constitute the inverter, such as an inductor coil and a smoothing capacitor, are in general accommodated together in the inverter accommodating section (an inverter box, a case, an outer frame, or the like) provided on the periphery of the housing and integrated into one unit (for example, see Patent Literatures 1 and 2). This is for the purpose of making the inverter-integrated electric compressor as compact as possible in consideration of the ease of mounting on vehicles.

CITATION LIST

Patent Literature

{PTL 1} the Publication of Japanese Patent No. 3827158
{PTL 2} Japanese Unexamined Patent Application, Publication No. 2003-322082
{PTL 3} Japanese Unexamined Patent Application, Publication No. 2006-316755

SUMMARY OF INVENTION

Technical Problem

However, when the power system board and the CPU board that constitute the inverter circuit section and the inductor coil, the smoothing capacitor, etc., which are high-voltage-system components, are accommodated together in one inverter accommodating section (including an inverter box, a case, and an outer frame), the circuit section and the high-voltage-system components will be disposed close to each other. This makes the inverter circuit section susceptible to electromagnetic noise generated from the high-voltage-system components, which may cause the inverter to produce self-noise interference, thus causing malfunctions.

To eliminate such electromagnetic noise interference by the high-voltage-system components, the inverter circuit section and the high-voltage-system components should be separately disposed; however, such a configuration may have problems, such as impairing the ease of assembly and hindering reductions in size and weight, and thus a countermeasure should be taken.

The present invention is made in consideration of such circumstances, and an object thereof is to provide an inverter-integrated electric compressor in which noise interference with an inverter circuit section due to electromagnetic noise generated from high-voltage-system components can be eliminated without impairing the ease of assembly and a reduction in size.

Solution to Problem

To solve the problems described above, an inverter-integrated electric compressor of the present invention adopts the following solutions.

Specifically, an inverter-integrated electric compressor according to a first aspect of the present invention is configured such that an inverter accommodating section is provided on the periphery of a housing accommodating an electric motor and a compression mechanism, and an inverter that converts DC power supplied from a high-voltage power supply to three-phase AC power and that supplies the three-phase AC power to the electric motor is provided therein, wherein the inverter accommodating section is divided into a first accommodating section accommodating an inverter module equipped with a power system board on which semiconductor switching devices etc. are mounted and a CPU board on which a control and communication circuit etc. are mounted; and a second accommodating section accommodating high-voltage-system components, such as a common-mode coil, a normal-mode coil, and a smoothing capacitor, provided on a high-voltage line for supplying the DC power supplied from the high-voltage power supply to the inverter module, the accommodating sections being separately provided on the periphery of the housing.

According to the first aspect of the present invention, the inverter accommodating section is divided into the first accommodating section accommodating the inverter module equipped with the power system board and the CPU board and the second accommodating section accommodating the high-voltage-system components, such as the common-mode coil, the normal-mode coil, and the smoothing capacitor, provided on the high-voltage line for supplying DC power to the inverter module, and the accommodating sections are separately provided on the periphery of the housing. This can block electromagnetic noise generated from the high-voltage-system components, such as the common-mode coil, the normal-mode coil, and the smoothing capacitor, by the second accommodating section, thereby interrupting propagation of the electromagnetic noise to the inverter module accommodated in the first accommodating section. Thus, a malfunction of the inverter due to self-noise can be prevented, thus improving the reliability.

Furthermore, the inverter-integrated electric compressor according to the first aspect of the present invention may be configured such that, in the above inverter-integrated electric compressor, the first accommodating section is provided on the upper surface of the periphery of the housing, and the second accommodating section is provided on the side surface of the periphery of the housing.

With the above configuration, since the first accommodating section is provided on the upper surface of the periphery of the housing, and the second accommodating section is provided on the side surface of the periphery of the housing, the divided first accommodating section and second accommodating section can be disposed next to each other on the upper surface and the side surface of the periphery of the housing. This can reduce the length of a part for electrically connecting the inverter module accommodated in the first accommodating section and the high-voltage-system components accommodated in the second accommodating section, such as a bus bar, and allows the inverter to be compactly installed so as to surround the periphery of the housing.

Furthermore, the inverter-integrated electric compressor according to the first aspect of the present invention may be configured such that, in any one of the above inverter-integrated electric compressors, the first accommodating section is formed integrally with the housing.

With the above configuration, since the first accommodating section is formed integrally with the housing, the inverter module can be accommodated in the first accommodating section formed integrally with the housing and can be integrated on the periphery of the housing. Thus, the inverter module can be durably protected and can be reliably shielded from the high-voltage-system components accommodated in the second accommodating section using the first accommodating section integrated with the housing.

Furthermore, the inverter-integrated electric compressor according to the first aspect of the present invention may be configured such that, in any one of the above inverter-integrated electric compressors, the second accommodating section is separate from the housing as an accommodating case for the high-voltage-system components and is integrally fixed on the periphery of the housing, with the high-voltage-system components accommodated therein.

With the above configuration, since the second accommodating section is separate from the housing, as an accommodating case for the high-voltage-system components, and is integrally fixed on the periphery of the housing, with the high-voltage-system components accommodated therein, the second accommodating section can be provided with a configuration best suited to accommodating the high-voltage-system components, such as the common-mode coil, the normal-mode coil, and the smoothing capacitor, together and blocking electromagnetic noise. This therefore allows the high-voltage-system components to be compactly installed together on the periphery of the housing and electromagnetic noise generated from the high-voltage-system components to be reliably blocked.

Furthermore, an inverter-integrated electric compressor according to a second aspect of the present invention is configured such that an inverter accommodating section is provided on the periphery of a housing accommodating an electric motor and a compression mechanism, and an inverter that converts DC power supplied from a high-voltage power supply to three-phase AC power and supplies the three-phase AC power to the electric motor is provided therein, wherein, in the inverter, high-voltage-system components, such as a common-mode coil, a normal-mode coil, and a smoothing capacitor, provided on a high-voltage line for supplying the DC power from the high-voltage power supply to the inverter are accommodated in an accommodating case separate from the inverter accommodating section and equipped with a terminal block to which high-voltage cables are connected, and the accommodating case is fixed on the periphery of the housing as an assembly integrated with the high-voltage cables.

According to the second aspect of the present invention, in the inverter, the high-voltage-system components, such as the common-mode coil, the normal-mode coil, and the smoothing capacitor, provided on the high-voltage line for supplying the DC power from the high-voltage power supply to the inverter are accommodated in the accommodating case separate from the inverter accommodating section and equipped with the terminal block to which the high-voltage cables are connected, and the accommodating case is mounted on the periphery of the housing as an assembly integrated with the high-voltage cables. This allows the high-voltage cables, the terminal block, the high-voltage-system components, etc. to be accommodated together in the accommodating case and to be mounted on the periphery of the housing as an integrated assembly. This can therefore improve the ease of assembly of the high-voltage cables, the terminal block, the high-voltage-system components, etc. and can block electromagnetic noise generated from those components by covering the components with the accommodating case, thereby preventing electromagnetic noise interference between the components and the inverter provided in the inverter accommodating section. Furthermore, since the relatively large high-voltage-system components can be compactly and collectively integrated on the periphery of the housing together with the high-voltage cables, the whole compressor can be made compact and lightweight.

Furthermore, the inverter-integrated electric compressor according to the second aspect of the present invention may be configured such that, in the above inverter-integrated electric compressor, the accommodating case is formed of aluminum, and the common-mode coil and the normal-mode coil are accommodated in the aluminum accommodating case with the use of a plastic case.

With the above configuration, since the accommodating case is formed of aluminum, and the common-mode coil and the normal-mode coil are accommodated in the aluminum accommodating case with the use of a plastic case, the high-voltage-system components can be durably protected by covering them with the aluminum accommodating case, and electromagnetic noise generated from the high-voltage-system components can be reliably blocked. Moreover, since the common-mode coil and the normal-mode coil are accommodated in the plastic case, work for mounting the coils in the aluminum accommodating case while ensuring insulation can be facilitated, and replacement of the coils can be handled by replacing the plastic cases, which allows the aluminum accommodating case to be shared. In addition, an independent plastic case may be provided for each of the coils, or alternatively, one case may be partitioned into a plurality of accommodating sections, in which the plurality of coils may be accommodated.

Furthermore, the inverter-integrated electric compressor according to the second aspect of the present invention may be configured such that, in any one of the above inverter-integrated electric compressors, the accommodating case is filled with silicone adhesive having a heat-dissipating property to both secure and insulate the high-voltage-system components.

With the above configuration, since the accommodating case is filled with the silicone adhesive having a heat-dissipating property both to secure and insulate the high-voltage-system components, the plurality of high-voltage-system components can be bonded to the accommodating case with the silicone adhesive and can be accommodated therein while ensuring their individual insulation. Moreover, heat generated from the high-voltage-system components can be dissipated through the silicone adhesive and the accommodating case. Accordingly, sufficient insulating performance and heat dissipating performance can be ensured.

Furthermore, the inverter-integrated electric compressor according to the second aspect of the present invention may be configured such that, in any one of the above inverter-integrated electric compressors, the plurality of high-voltage-system components accommodated in the accommodating case are electrically connected through a bus bar.

With the above configuration, since the plurality of high-voltage-system components accommodated in the accommodating case are electrically connected through the bus bar, the plurality of high-voltage-system components can be simply connected by welding the connection terminals of the high-voltage-system components to the bus bar. This therefore eliminates the need for ensuring an excessive space in the accommodating case, allowing the accommodating case to be made compact.

Furthermore, the inverter-integrated electric compressor according to the second aspect of the present invention may be configured such that, in any one of the above inverter-integrated electric compressors, the accommodating case has a screw hole and a mounting surface for mounting the components to be accommodated.

With the above configuration, since the accommodating case has the screw hole and the mounting surface for mounting the components to be accommodated, a screw hole and a mounting surface corresponding thereto can be omitted from the housing. This can reduce the risk of, for example, refrigerant leakage, which will increase due to a screw hole and a mounting surface processed on the housing, thereby improving the reliability.

Furthermore, the inverter-integrated electric compressor according to the second aspect of the present invention may be configured such that, in any one of the above inverter-integrated electric compressors, the accommodating case is fixed on the side surface of the periphery of a low-pressure portion of the housing.

With the above configuration, since the accommodating case is fixed on the side surface of the periphery of the low-pressure portion of the housing, the accommodating case for the high-voltage-system components fixed to the side surface of the periphery of the housing can be cooled with low-pressure refrigerant gas flowing through the low-pressure portion in the housing as a heatsink. Accordingly, the high-voltage-system components accommodated in the accommodating case can be cooled with the housing serving as a heatsink.

Furthermore, the inverter-integrated electric compressor according to the second aspect of the present invention may be configured such that, in the above-configured inverter-integrated electric compressor, the accommodating case is fixed to the side surface of the periphery of the low-pressure portion, having a suction port, of the housing.

With the above configuration, since the accommodating case is fixed to the side surface of the periphery of the low-pressure portion, having the suction port, of the housing, the accommodating case can be cooled efficiently by lowest-temperature low-pressure refrigerant gas taken into the low-pressure portion in the housing through the suction port. Accordingly, this can further enhance the efficiency of cooling the high-voltage-system components accommodated in the accommodating case.

Furthermore, the inverter-integrated electric compressor according to the second aspect of the present invention may be configured such that, in the above-configured inverter-integrated electric compressor, the accommodating case accommodates the common-mode coil and the normal-mode coil at a portion close to the suction port.

With the above configuration, since the common-mode coil and the normal-mode coil are disposed at the portion close to the suction port in the accommodating case, the common-mode coil and the normal-mode coil can be cooled efficiently with the lowest-temperature low-pressure refrigerant gas taken into the housing through the suction port as a heatsink. Accordingly, this can enhance the efficiency of cooling the common-mode coil and the normal-mode coil that generate a large amount of heat among the high-voltage-system components.

Furthermore, the inverter-integrated electric compressor according to the second aspect of the present invention may be configured such that, in any one of the above inverter-integrated electric compressors, the accommodating case is fixed on the fixing surface of the periphery of the housing with an O-ring therebetween, and with a metal-contact portion left thereon.

With the above configuration, since the accommodating case is fixed on the fixing mounting surface of the periphery of the housing with the O-ring therebetween, and with the metal-contact portion left thereon, waterproofing of the interior of the accommodating case can be ensured by the O-ring, and the accommodating case can be cooled by the housing serving as a heatsink with the metal-contact portion of the fixing mounting surface as a heat transfer surface. Accordingly, even if the accommodating case is separate, the waterproof and cooling performance can be sufficiently ensured. In addition, to enhance the cooling effect, the area of the flange surface of the fixing mounting surface should be increased.

Furthermore, the inverter-integrated electric compressor according to the second aspect of the present invention may be configured such that, in any one of the above inverter-integrated electric compressors, the outer surface of the accommodating case is provided with a surface-area reducing part and/or a heat-input hindering part.

With the above configuration, since the outer surface of the accommodating case is provided with the surface-area reducing part and/or the heat-input hindering part, heat input to the accommodating case due to radiation or the like from the outside can be reduced as much as possible. Accordingly, this can enhance the cooling effect on the accommodating case. Note that providing the surface-area reducing part means providing no ribs and reduced-wall portions on the outer surface; and providing the heat-input hindering part means polishing the outer surface, or for die-cast products, providing no shot blasting on the outer surface, or the like.

Furthermore, the inverter-integrated electric compressor according to the second aspect of the present invention may be configured such that, in any one of the above inverter-integrated electric compressors, the high-voltage-system components accommodated in the accommodating case and the inverter accommodated in the inverter accommodating section are electrically connected through a relay bus bar.

With the above configuration, since the high-voltage-system components accommodated in the accommodating case and the inverter accommodated in the inverter accommodating section are electrically connected through the relay bus bar, a change of the mounting position of the accommodating case can easily be handled by replacing the relay bus bar. Accordingly, this can increase the flexibility of the mounting position of the accommodating case relative to the housing, thus improving the ease of mounting. In addition, the relay bus bar is connected by welding, thus making it difficult to unmount it even without a special bolt.

Furthermore, the inverter-integrated electric compressor according to the second aspect of the present invention may be configured such that, in any one of the above inverter-integrated electric compressors, the high-voltage cables are connected to the accommodating case from a high-pressure portion of the housing along the direction of the motor axis.

With the above configuration, since the high-voltage cables are connected to the accommodating case from the high-pressure portion of the housing along the direction of the motor axis, the high-voltage cables can be wired in the direction of the motor axis using the peripheral space of the high-pressure portion of the housing in which the compression mechanism is accommodated. Accordingly, this can further reduce a space necessary for mounting the inverter-integrated electric compressor, thus improving the ease of mounting.

Advantageous Effects of Invention

With the inverter-integrated electric compressor of the present invention, electromagnetic noise generated from the high-voltage-system components, such as the common-mode coil, the normal-mode coil, and the smoothing capacitor, can be blocked by the second accommodating section, thereby interrupting propagation of the electromagnetic noise to the inverter module accommodated in the first accommodating section, which can prevent a malfunction of the inverter due to self-noise, thus improving the reliability.

Furthermore, with the inverter-integrated electric compressor of the present invention, the high-voltage cables, the terminal block, the high-voltage-system components, etc. can be accommodated together in the accommodating case and can be mounted on the periphery of the housing as an integrated assembly. This can therefore improve the ease of assembly of the high-voltage cables, the terminal block, the high-voltage-system components, etc. and can block electromagnetic noise generated from those components by covering the components with the accommodating case, thereby preventing electromagnetic noise interference between the components and the inverter provided in the inverter accommodating section. Furthermore, since the relatively large high-voltage-system components can be compactly and collectively integrated on the periphery of the housing together with the high-voltage cables, the whole compressor can be made compact and lightweight.

DESCRIPTION OF EMBODIMENTS

An embodiment of the present invention will be described hereinbelow with reference to FIGS. 1 to 12.

Figure 1:
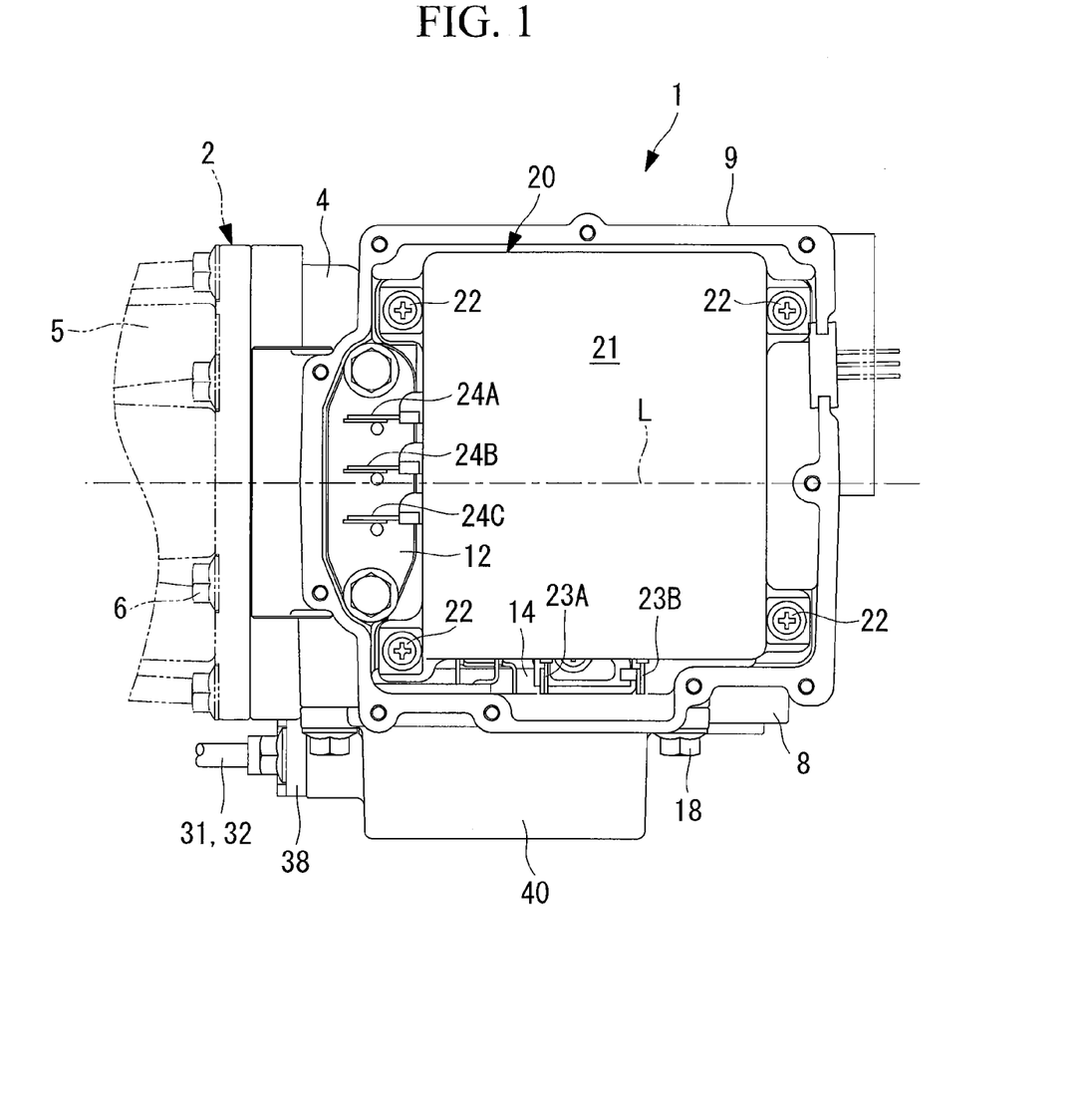
FIG. 1 is a plan view of an inverter-integrated electric compressor according to an embodiment of the present invention, with a cover member of an inverter accommodating section removed.
Figure 2:
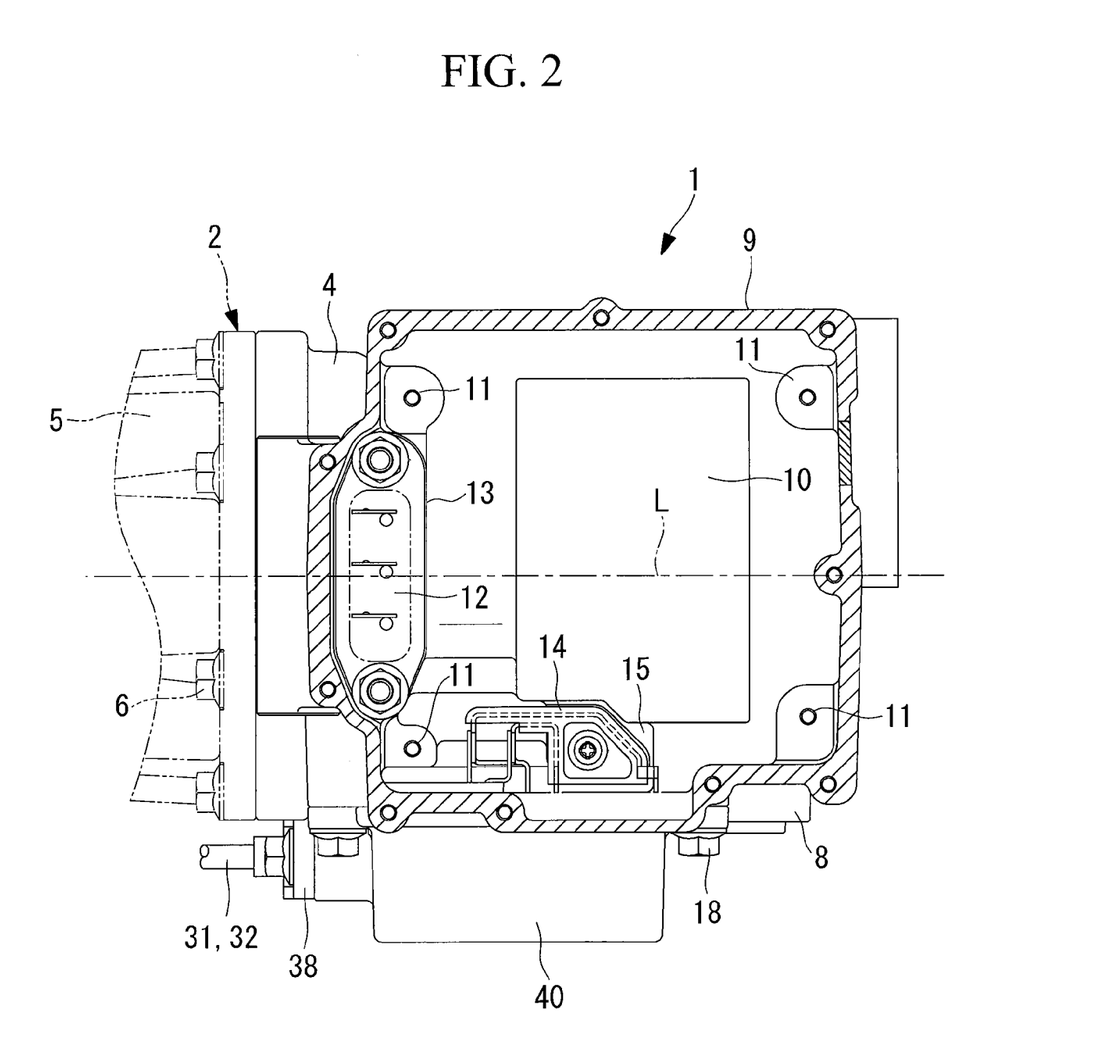
FIG. 2 is a plan view of the inverter-integrated electric compressor shown in FIG. 1, with an inverter module in the inverter accommodating section removed.
Figure 3:
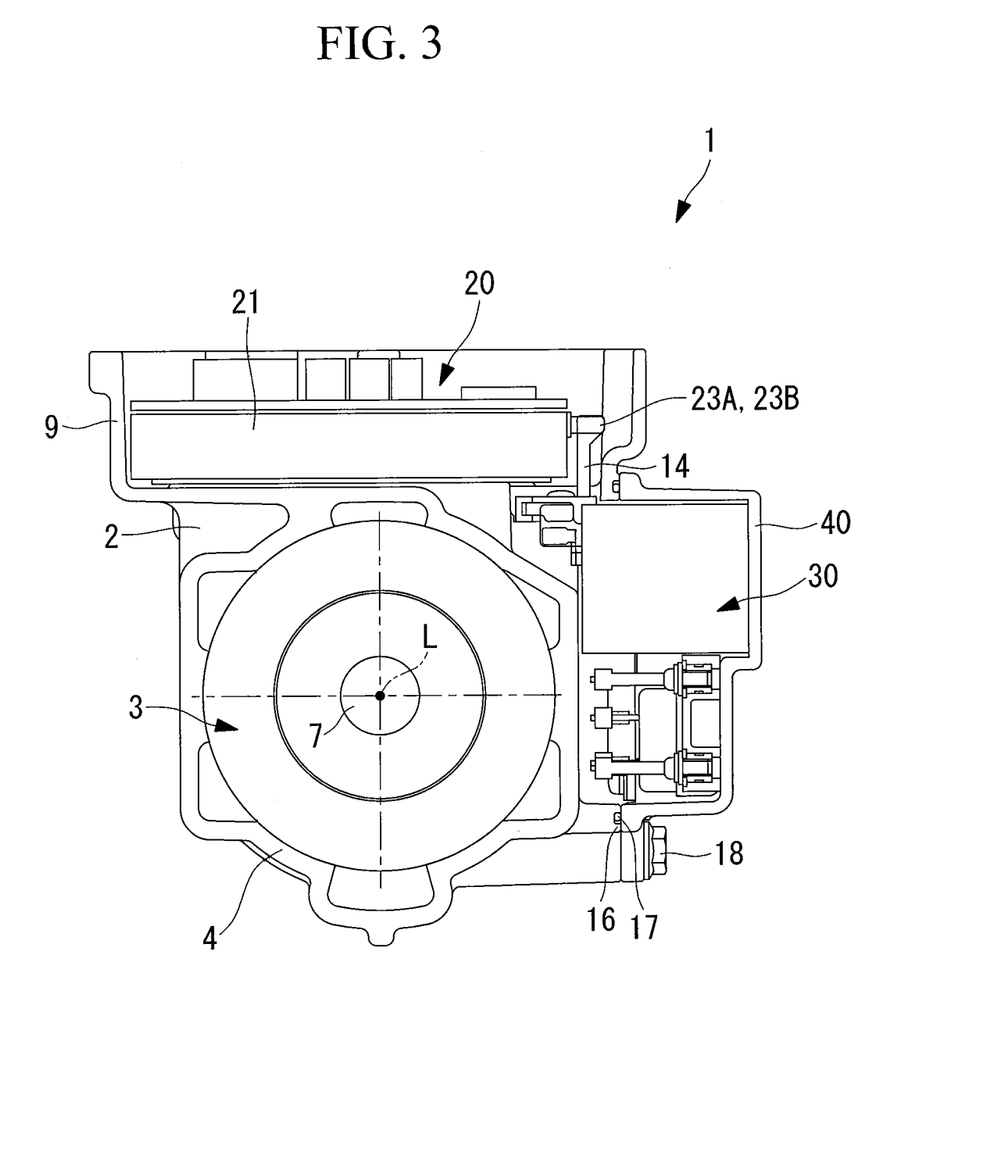
FIG. 3 is a longitudinal sectional view of the inverter-integrated electric compressor shown in FIG. 1.
Figure 4:
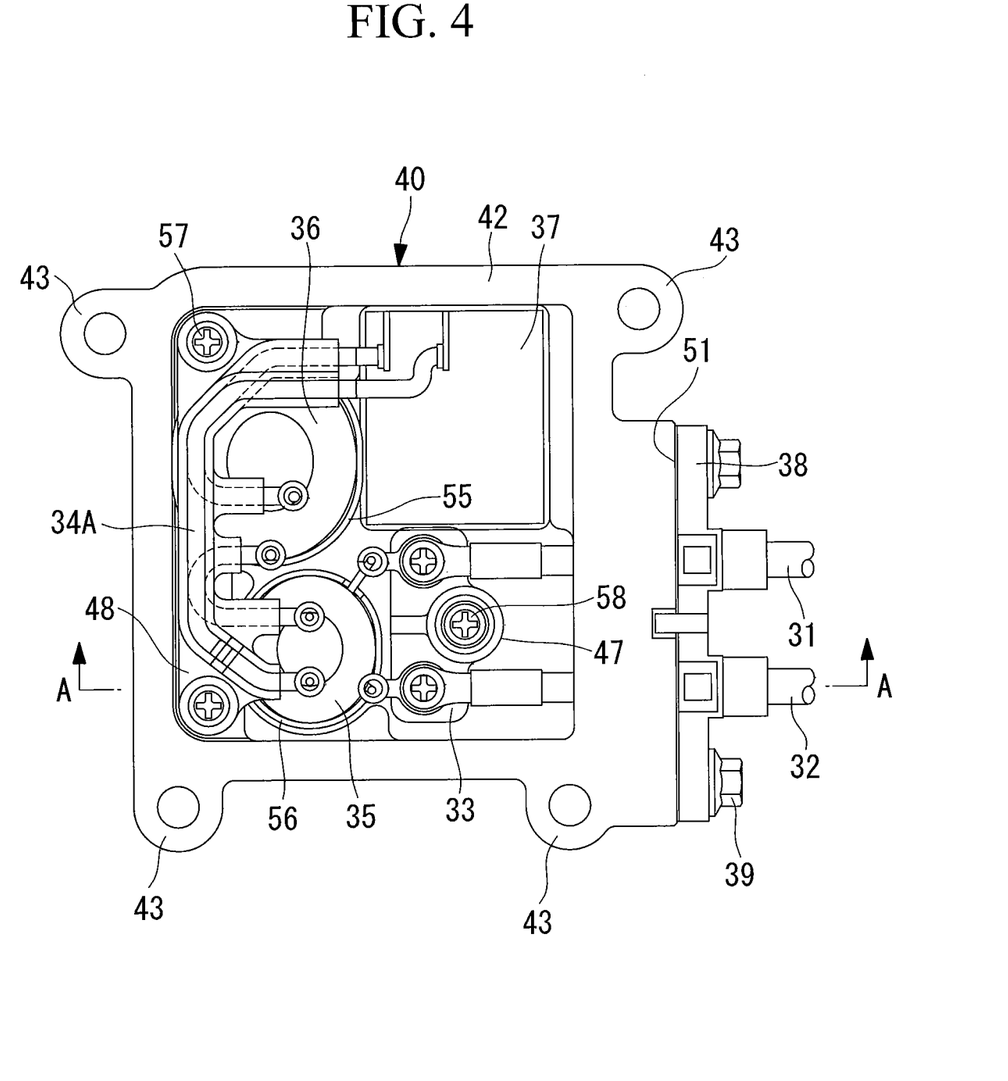
FIG. 4 is a plan view of an accommodating case assembly that accommodates high-voltage-system components of the inverter-integrated electric compressor shown in FIG. 1.
Figure 5:
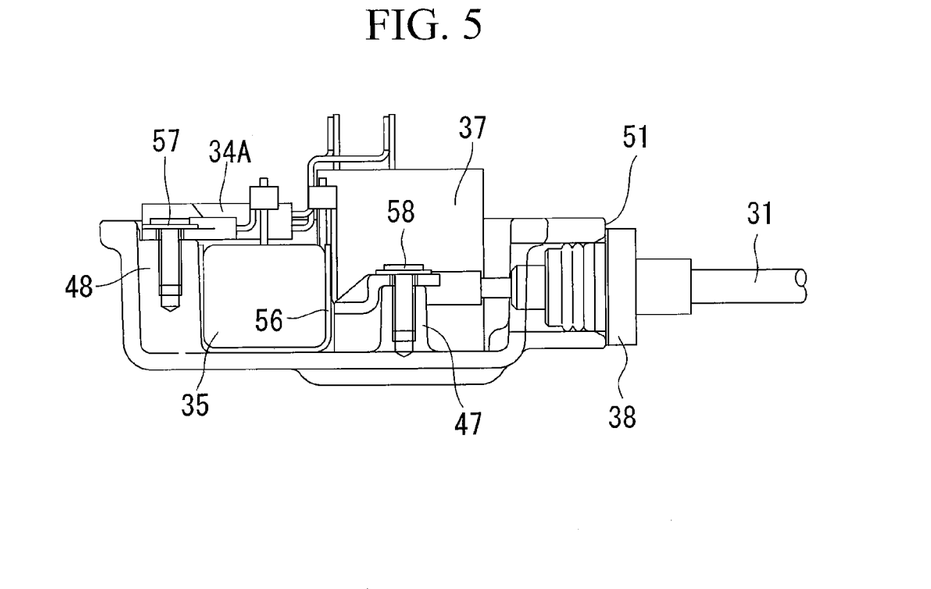
FIG. 5 is a cross-sectional view taken along line A-A in FIG. 4.
Figure 6:
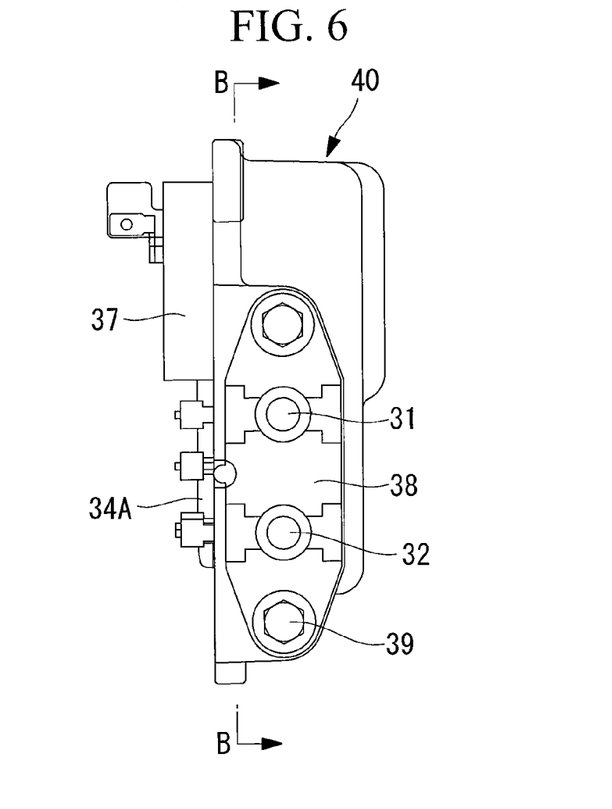
FIG. 6 is a right side view of FIG. 4.
Figure 7:
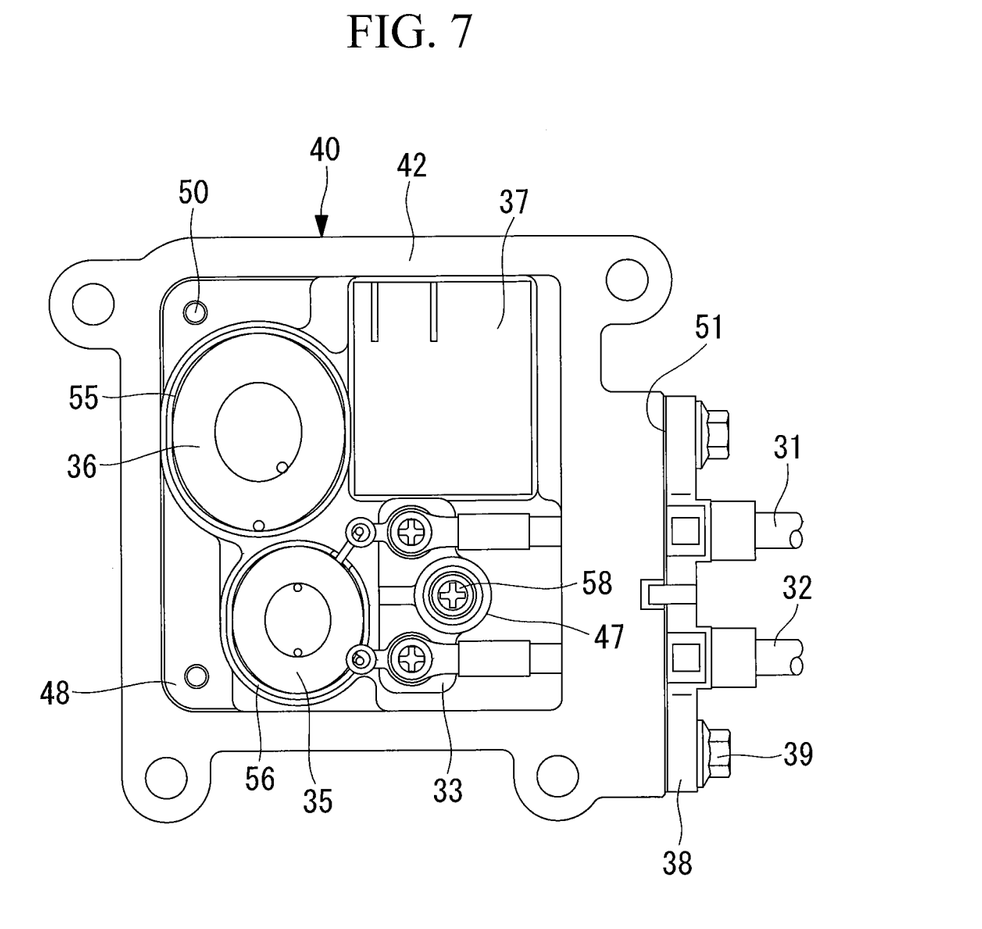
FIG. 7 is a cross-sectional view taken along line B-B in FIG. 6.

FIG. 1 is a plan view of an inverter-integrated electric compressor according to an embodiment of the present invention, with a cover member of an inverter accommodating section removed; FIG. 2 is a plan view, with an inverter module removed; and FIG. 3 is a longitudinal sectional view thereof.

An inverter-integrated electric compressor 1 includes a cylindrical housing 2 that forms the outer shell thereof. The cylindrical housing 2 is constructed by fastening together a motor housing 4 accommodating an electric motor 3 and a compressor housing 5 accommodating a compression mechanism (not shown) with bolts 6, the housings 4 and 5 being formed by aluminum die casting. In this embodiment, the motor housing 4 side is mainly illustrated.

The electric motor 3 and the compression mechanism (not shown) accommodated in the housing 2 are joined together via a motor shaft 7 and are configured such that the compression mechanism is driven by the rotation of the electric motor 3. A suction port 8 for taking in low-pressure refrigerant gas is provided at the peripheral portion at the rear end of the housing (motor housing 4) 2 (at the right of FIG. 1), and the refrigerant gas taken into the housing 2 through the suction port 8 flows around the electric motor 3 in the direction of the axis L of the motor shaft 7 and is then taken into the compression mechanism, where it is compressed. The high-temperature high-pressure refrigerant gas compressed by the compression mechanism is discharged into a discharge chamber in the housing (compressor housing 5) 2 and is expelled outside through a discharge port (not shown) provided at the front end of the housing (compressor housing 5) 2.

Thus, the motor housing 4 side of the housing 2 in which the electric motor 3 is accommodated is defined as a low-pressure portion in which low-pressure refrigerant gas is taken in through the suction port 8 provided at the rear end and flows to the compressor housing 5. The compressor housing 5 side joined to the motor housing 4 is defined as a high-pressure portion, that is, a portion opposite the motor housing, with the built-in compression mechanism interposed therebetween, in which the discharge chamber into which the compressed high-pressure refrigerant gas is discharged is formed.

The housing 2 has mounting legs (not shown) at three positions, for example, on the bottom at the rear end and on the bottom and the top at the front end. The inverter-integrated electric compressor 1 is mounted on a vehicle fixed to a cantilever-type bracket provided at a side wall or the like of a vehicle engine with bolts or the like via the mounting legs. The inverter-integrated electric compressor 1 is generally cantilevered at three points at the top and bottom, with one side surface placed along the cantilever-type bracket and a motor axis L oriented in the front-to-back direction or the left-to-right direction of the vehicle.

Furthermore, an inverter accommodating section (first accommodating section) 9 that is substantially rectangular in plan view is integrally formed on the upper surface of the periphery of the housing (motor housing 4) 2. The inverter accommodating section (first accommodating section) 9 has a box structure that is open at the top and is surrounded by a peripheral wall with a predetermined height, that is configured such that the top is sealed with a plate-like cover member (not shown) after an inverter module (inverter circuit section) 21 that constitutes the inverter 20 is accommodated therein.

The inverter accommodating section (first accommodating section) 9 is constructed such that a portion corresponding to the peripheral surface of the housing 2 is made a substantially flat bottom, inside of which are provided a contact surface 10 with which the back of a power system board that constitutes the inverter module (inverter circuit section) 21 is brought into contact, mounting bosses 11 on which the inverter module 21 is mounted, a mounting hole 13 in which a glass-sealed terminal 12 through which three-phase AC power converted by the inverter 20 is supplied to the electric motor 3 is mounted, a mounting surface 15 on which a relay bus bar 14 through which high-voltage DC power is supplied to the inverter module 21 via high-voltage-system components 30 described below is mounted, etc.

In the inverter accommodating section 9, the inverter module (inverter circuit section) 21 that constitutes the circuit section of the inverter 20 is mounted on the mounting bosses 11 with screws 22. The inverter module (inverter circuit section) 21 is modularized by integrating a power system board on which a plurality of semiconductor switching devices, such as IGBTs, and driving circuits therefor etc. are mounted and a CPU board on which a control and communication circuit etc. operated at low voltage, such as a CPU, are mounted with the use of a plastic case, and is mounted such that the bottom of the power system board is in contact with the contact surface 10 in the inverter accommodating section (first accommodating section) 9 and is cooled via the low-pressure refrigerant gas flowing in the housing (motor housing 4) 2.

The above inverter module (inverter circuit section) 21 includes P-N terminals 23A and 23B to which high-voltage DC power is input via the relay bus bar 14 and U-V-W terminals 24A, 24B, and 24C that supply the three-phase AC power converted by the inverter 20 to the electric motor 3 through the glass-sealed terminal 12 such that the terminals 23A and 23B and 24A to 24C protrude from the periphery of the inverter module 21.

A mounting surface (flange surface) 16 for fixing an accommodating case 40 that accommodates the high-voltage-system components 30 constituting part of the inverter 20 is integrally formed on the side surface of the periphery of the housing (motor housing 4) 2 at the low-pressure side in which the suction port 8 is provided. The mounting surface (flange surface) 16 has a substantially rectangular flange having a constant width, on which the accommodating case (second accommodating section) 40 is fastened with bolts 18 so as to make metal-contact with the flange surface, with a waterproofing O-ring 17 therebetween.

Figure 12:
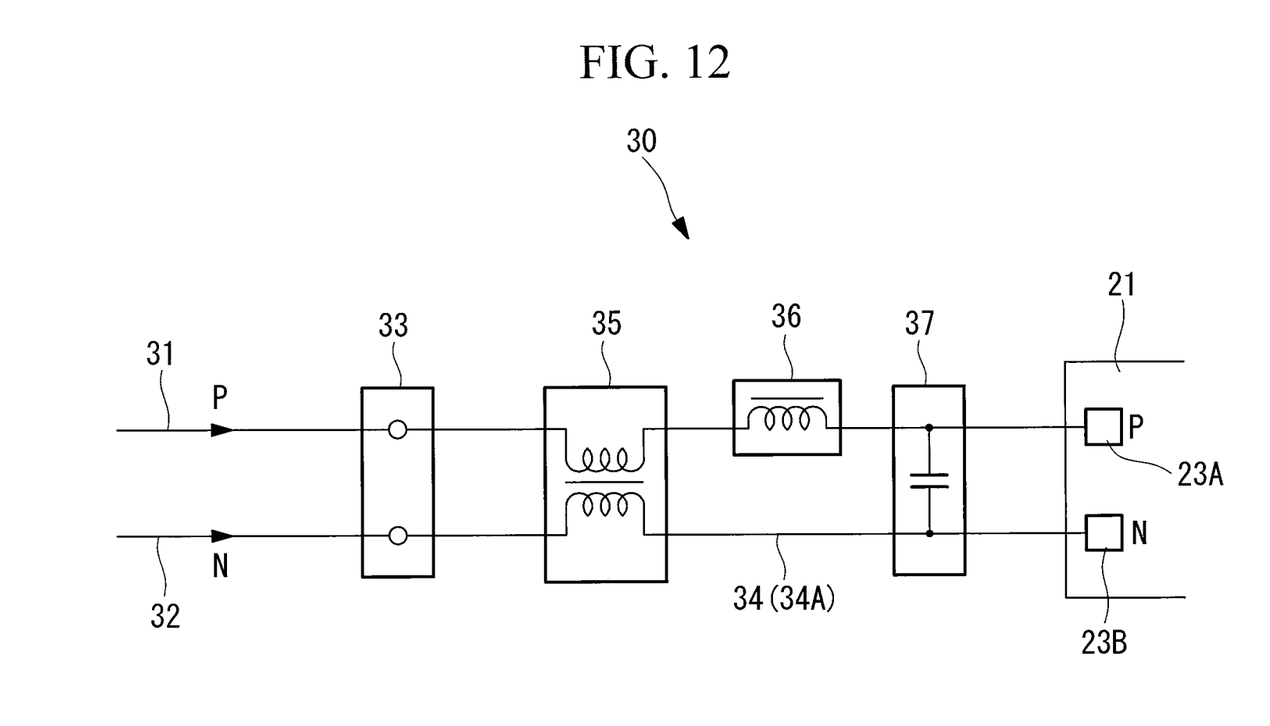
FIG. 12 is an electrical wiring diagram of an inverter high-voltage line of the inverter-integrated electric compressor shown in FIG. 1.

As shown in FIG. 12, the high-voltage-system components 30 accommodated in the accommodating case (second accommodating section) 40 include a common-mode coil 35, a normal-mode coil 36, and a smoothing capacitor 37 which are provided on a high-voltage line 34 connected from a high-voltage power unit to a terminal block 33 via high-voltage cables 31 and 32, for supplying high-voltage DC power from the terminal block 33 to the P-N terminals 23A and 23B of the inverter module 21 and which are for reducing common-mode noise, switching noise, current ripples, etc. of the inverter 20.

As shown in FIGS. 8 to 11, the accommodating case (second accommodating section) 40 is a substantially rectangular case formed of die-cast aluminum and having a space 41 for accommodating the high-voltage-system components 30 and has a flange surface 42, around the periphery, that is in contact with (makes metal-contact with) the mounting surface (flange surface) 16 of the housing 2, with the O-ring 17 therebetween, and mounting portions 43 integrally formed at the four corners and fastened to the housing 2 with the bolts 18.

Figure 8:
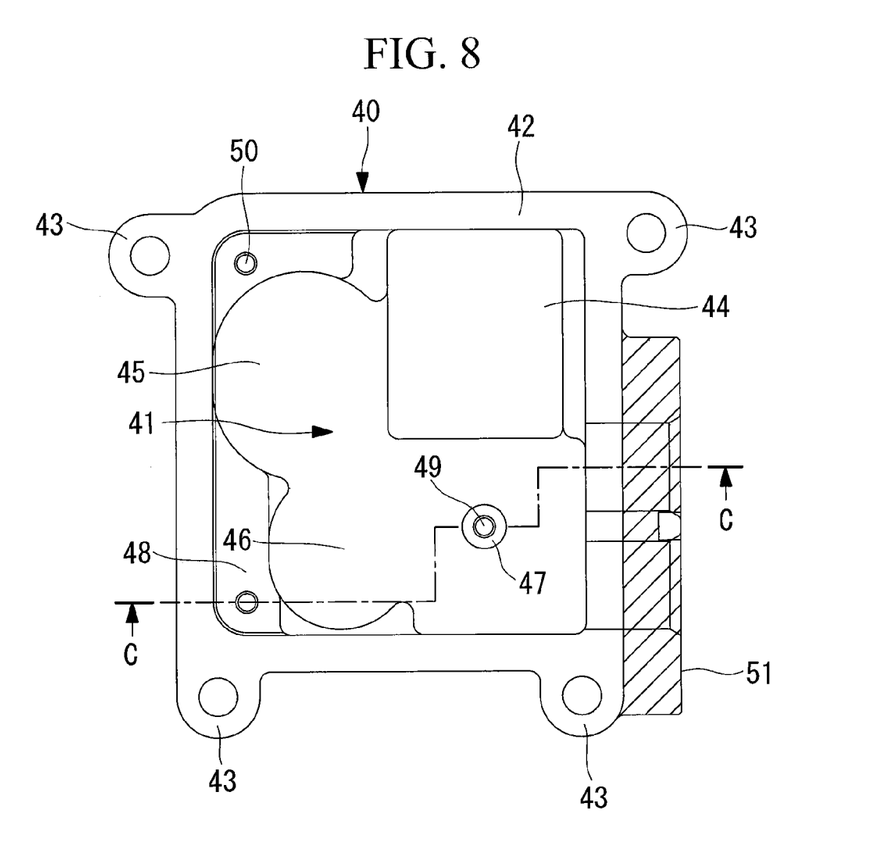
FIG. 8 is a plan view of the accommodating case that accommodates the high-voltage-system components shown in FIG. 4.
Figure 9:
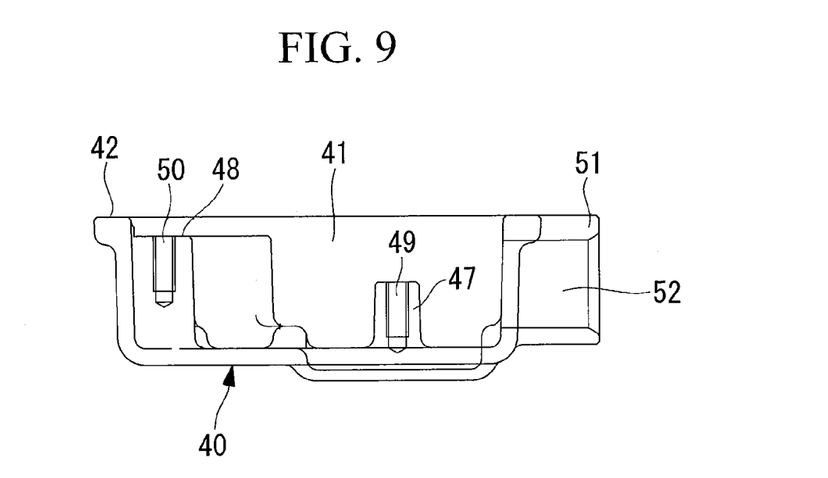
FIG. 9 is a cross-sectional view taken along line C-C in FIG. 8.
Figure 10:
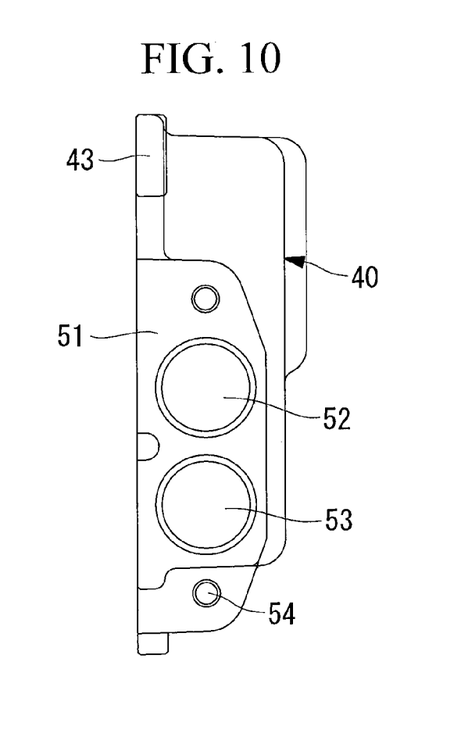
FIG. 10 is a right side view of FIG. 8.

The space 41 for accommodating the high-voltage-system components 30 is provided with a rectangular smoothing-capacitor mounting portion 44 for accommodating the smoothing capacitor 37, an elliptical normal-mode-coil mounting portion 45 for accommodating the normal-mode coil 36, an elliptical common-mode-coil mounting portion 46 for accommodating the common-mode coil 35, a mounting boss (mounting surface) 47 for mounting the terminal block 33 to which the high-voltage cables 31 and 32 are connected, and a mounting boss (mounting surface) 48 of a bus bar assembly (bus bar) 34A constituting the high-voltage line 34 that electrically connects the common-mode coil 35, the normal-mode coil 36, and the smoothing capacitor 37.

The normal-mode-coil mounting portion 45 and the common-mode-coil mounting portion 46 described above are provided at the side adjacent to the suction port 8 (on the left of FIG. 8), with the accommodating case 40 disposed in the housing 2. The bottom surfaces of the smoothing-capacitor mounting portion 44, the normal-mode-coil mounting portion 45, and the common-mode-coil mounting portion 46 are flat mounting surfaces, and the mounting bosses (mounting surfaces) 47 and 48 on which the terminal block 33 and the bus bar assembly 34A are respectively mounted have screw holes 49 and 50 for securing the terminal block 33 and the bus bar assembly 34A with screws, respectively.

Figure 11:
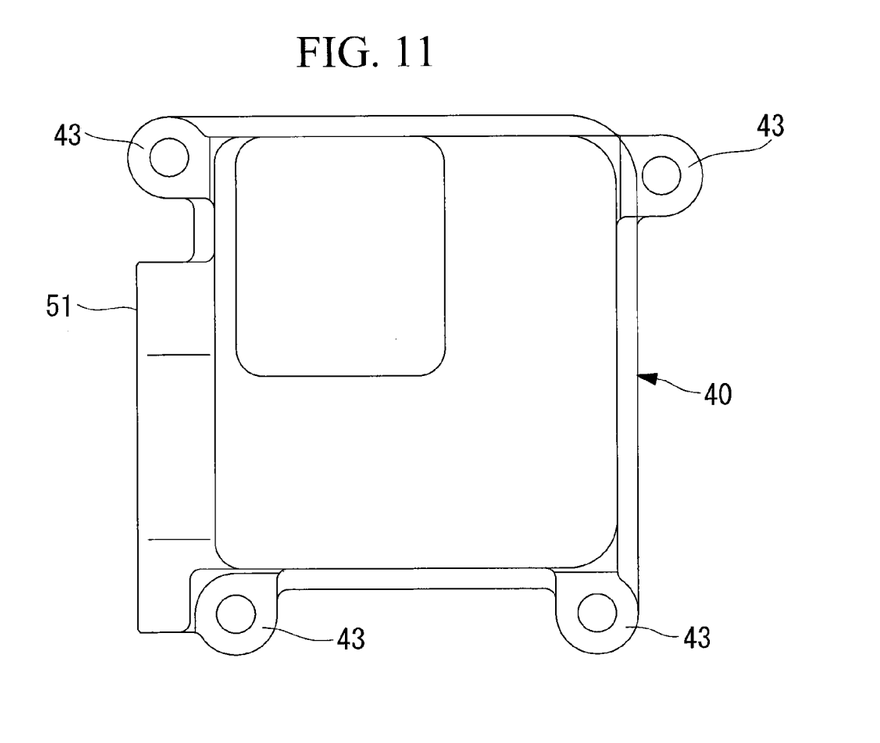
FIG. 11 is a back view of FIG. 8.

The side surface of the accommodating case 40 facing the compressor housing 5 (the right side surface in FIG. 8) is provided with a connector connecting surface 51 to which connectors 38 provided for the high-voltage cables 31 and 32 are fastened with bolts 39. The connector connecting surface 51 has through-holes 52 and 53 through which the high-voltage cables 31 and 32 pass and screw holes 54 in which the bolts 39 are tightened. As shown in FIG. 11, to reduce heat input due to radiation or the like from the outside as much as possible, the outer surface of the accommodating case 40 is configured having a simple smooth flat surface without providing ribs and reduced-wall portions that would increase the surface area, and shot blasting of the outer surface is omitted even though it is a die-cast product.

As shown in FIGS. 4 to 7, in the space 41 of the accommodating case (second accommodating section) 40 described above, the smoothing capacitor 37 whose external form is enclosed by a rectangular parallelepiped case is fixed to the rectangular smoothing-capacitor mounting portion 44 with silicone adhesive; the elliptic cylindrical normal-mode coil 36 accommodated in a plastic case 55 is fixed to the elliptical normal-mode-coil mounting portion 45 with silicone adhesive; and the elliptic cylindrical common-mode coil 35 accommodated in a plastic case 56 is fixed to the elliptical common-mode-coil mounting portion 46 with silicone adhesive.

As shown in FIG. 12, the common-mode coil 35, the normal-mode coil 36, and the smoothing capacitor 37 are electrically connected through the bus bar assembly 34A that is fixed to the mounting boss 48 with screws 57. The terminals of the common-mode coil 35, the normal-mode coil 36, and the smoothing capacitor 37 and the bus bar assembly 34A are connected by welding.

In the space 41 of the accommodating case (second accommodating section) 40, the terminal block 33 is fixed to the mounting boss 47 with a screw 58. Two terminals of the common-mode coil 35 are connected to the terminal block 33; the connectors 38 are connected to the connector connecting surface 51 of the accommodating case 40 with the bolts 39; and the terminals provided at the ends are connected to the high-voltage cables 31 and 32 extending into the accommodating case 40 through the through-holes 52 and 53, respectively, by screwing or the like.

As described above, the space 41 of the accommodating case 40 accommodates the high-voltage-system components 30, such as the common-mode coil 35, the normal-mode coil 36, and the smoothing capacitor 37, the terminal block 33, the bus bar assembly 34A, and the high-voltage cables 31 and 32 installed therein, which are tightly fixed to the mounting surface (flange surface) 16 of the housing 2, with the O-ring 17 therebetween, using the bolts 18 as an integrated assembly (subassembly). A gap in the space 41 of the accommodating case 40 is filled with silicone adhesive having a thermal dissipation property to fasten the high-voltage-system components 30 and ensure electrical insulation between the accommodated components, and after the silicone adhesive is filled, the components are assembled in the housing 2.

The high-voltage cables 31 and 32 connected to the side surface of the accommodating case 40 facing the compressor housing 5 (the right side surface in FIG. 8) with the connectors 38 are wired from the direction of the motor axis L using a space along the peripheral side surface of the housing 5. Output terminals of the high-voltage-system component 30 disposed in the accommodating case 40 (output terminals of the smoothing capacitor 37) and the P-N terminals 23A and 23B of the inverter module 21 disposed in the inverter accommodating section 7 are electrically connected through the above-described relay bus bar 14.

With the configuration described above, this embodiment provides the following operational advantages.

High-voltage DC power supplied from a power unit mounted in the vehicle to the electric compressor 1 through the high-voltage cables 31 and 32 is input to the terminal block 33 disposed in the accommodating case (second accommodating section) 40 through the connectors 38. The DC power passes through the common-mode coil 35 connected to the terminal block 33, passes through the normal-mode coil 36 and the smoothing capacitor 37 connected downstream through the bus bar assembly 34A, and is then input to the P-N terminals 23A and 23B of the inverter module 21 through the relay bus bar 14. During this process, common-mode noise, switching noise, and current ripples are reduced by the common-mode coil 35, the normal-mode coil 36, and the smoothing capacitor 37, as is well-known.

The DC power input to the P-N terminals 23A and 23B of the inverter module (inverter circuit section) 21 is converted to three-phase AC power with a command frequency by the switching operation of the semiconductor switching devices on the power board controlled on the basis of a command signal transmitted from a higher-level control unit (not shown) to the CPU board. The three-phase AC power is supplied from the U-V-W terminals 24A, 24B, and 24C provided on the inverter module 21 through the glass-sealed terminal 12 to the electric motor 3 in the housing 2. Thus, the electric motor 3 is rotationally driven at the command frequency to operate the compression mechanism.

By the operation of the compression mechanism, low-temperature, low-pressure refrigerant gas is taken into the housing (motor housing 4) 2 through the suction port 8. The refrigerant flows around the electric motor 3 in the direction of the axis L of the motor shaft 7 and is taken into the compression mechanism, where it is compressed to a high-temperature, high-pressure state, and is then discharged to the discharge chamber in the housing (compressor housing 5) 2. The high-pressure refrigerant is expelled outside through the discharge port. During this process, the low-temperature, low-pressure refrigerant gas taken in through the suction port 8 at one end of the housing (motor housing 4) 2 and made to flow in the direction of the motor axis L forcedly cools the heat-generating components, such as the semiconductor switching devices (IGBT), on the power system board of the inverter module 21 that is mounted in contact with the contact surface 10 in the inverter accommodating section (first accommodating section) 9 via the wall surface of the motor housing 4.

Likewise, the accommodating case (second accommodating section) 40 fixed to the mounting surface 16 provided around the periphery of the housing (motor housing 4) 2 in such a manner that the flange surface 42 is in metal-contact therewith is cooled via the housing (motor housing 4) 2 serving as a heatsink with the flange surface 42 serving as a heat transfer surface, so that the high-voltage-system components 30 accommodated therein, such as the common-mode coil 35, the normal-mode coil 36, and the smoothing capacitor 37, can be cooled.

In particular, since the accommodating case 40 is mounted on the peripheral surface in which the suction port 8 is provided, the accommodating case 40 can be efficiently cooled via the housing 2 by the low-temperature refrigerant gas taken in through the suction port 8. This can further increase the efficiency of cooling the high-voltage-system components 30 accommodated in the accommodating case 40. Furthermore, since the common-mode coil 35 and the normal-mode coil 36 are accommodated, close to the suction port 8, in the accommodating case 40, the common-mode coil 35 and the normal-mode coil 36 that generate much heat can be efficiently cooled, thus enhancing the cooling effect.

Accordingly, the individual heat-generating components constituting the inverter 20 can be efficiently cooled, and the heat-resisting performance of the individual heat-generating components can be enhanced, thereby improving the reliability of the inverter 20. Furthermore, the accommodating case 40 is filled with the silicone adhesive having a heat-dissipating property to both secure and insulate the high-voltage-system components 30. This not only allows the high-voltage-system components 30 to be accommodated in the accommodating case 40 while ensuring their individual insulation but also allows heat radiated from the high-voltage-system components 30 to be dissipated through the silicone adhesive and the accommodating case 40, thus sufficiently ensuring the heat dissipating performance of the high-voltage-system components 30.

Note that the effect of cooling the high-voltage-system components 30 depends on the areas of the mounting surface 16 and the flange surface 42 serving as heat transfer surfaces. Accordingly, by increasing the area of the flange to increase the heat transfer area, the cooling effect can be enhanced.

Furthermore, the inverter accommodating section for integrally installing the inverter 20 on the periphery of the housing 2 is divided into the two accommodating sections: the inverter accommodating section (first accommodating section) 9 accommodating the inverter module 21 in which the power system board and the CPU board are modularized; and the accommodating case (second accommodating section) 40 accommodating the high-voltage-system components 30, such as the common-mode coil 35, the normal-mode coil 36, and the smoothing capacitor 37, provided on the high-voltage line 34 for supplying DC power to the inverter module 21, and the accommodating sections are separately provided on the periphery of the housing 2. This can block electromagnetic noise generated from the high-voltage-system components 30, such as the common-mode coil 35, the normal-mode coil 36, and the smoothing capacitor 37, by covering them with the accommodating case (second accommodating section) 40, thereby interrupting propagation of the electromagnetic noise to the inverter module 21 accommodated in the inverter accommodating section (first accommodating section) 9. Thus, a malfunction of the inverter 20 due to self-noise can be prevented, thus improving the reliability.

In this case, the high-voltage cables 31 and 32, the terminal block 33, the bus bar assembly 34A, the high-voltage-system components 30, etc. can be accommodated together in the accommodating case 40 and can be mounted on the periphery of the housing 2 as an integrated assembly (subassembly). This can therefore improve the ease of assembly of the high-voltage cables 31 and 32, the terminal block 33, the bus bar assembly 34A, the high-voltage-system components 30, etc. and can block electromagnetic noise generated from those components, as described above, thereby preventing the electromagnetic noise interference between the components and the inverter module 21 provided in the inverter accommodating section 9. Furthermore, since the relatively large high-voltage-system components 30 can be compactly and collectively integrated on the periphery of the housing 2 together with the high-voltage cables 31 and 32, the whole compressor can be made compact and lightweight.

Furthermore, since the inverter accommodating section 9 accommodating the inverter module 21 is provided on the upper surface of the periphery of the housing 2, and the accommodating case 40 accommodating the high-voltage-system components 30 etc. is provided on the side surface of the periphery of the housing 2, the inverter accommodating section 9 and the accommodating case 40 can be disposed next to each other on the upper surface and the side surface of the periphery of the housing 2. This can reduce the length of the relay bus bar 14 that electrically connects the inverter module 21 accommodated in the inverter accommodating section 9 and the high-voltage-system components 30 accommodated in the accommodating case 40 and allows the inverter 20 to be compactly installed so as to surround the periphery of the housing 2.

Furthermore, the inverter accommodating section 9 is formed integrally with the housing 2; therefore, by installing the inverter module 21 that is formed integrally with the housing 2 in the inverter accommodating section 9, the inverter module 21 can be durably protected and can be reliably shielded from the high-voltage-system components 30 accommodated in the accommodating case 40. Furthermore, since the accommodating case 40 is provided as a case for accommodating the high-voltage-system components 30, separate from the housing 2, and is fixed on the periphery of the housing 2, the accommodating case 40 can be provided with a configuration best suited to accommodating the common-mode coil 35, the normal-mode coil 36, the smoothing capacitor 37, etc. together and blocking electromagnetic noise. This therefore allows the high-voltage-system components 30 to be compactly installed together on the periphery of the housing 2 and electromagnetic noise generated from the high-voltage-system components 30 to be reliably blocked.

Furthermore, since the accommodating case 40 is formed of aluminum, and the common-mode coil 35 and the normal-mode coil 36 are accommodated in the accommodating case 40 formed of aluminum with the use of the plastic cases 55 and 56, respectively, the high-voltage-system components 30 etc. can be durably protected by covering them with the lightweight and strong aluminum accommodating case 40. Moreover, since the common-mode coil 35 and the normal-mode coil 36 are accommodated in the plastic cases 55 and 56, respectively, work for mounting the coils in the aluminum accommodating case 40 while ensuring insulation can be facilitated, and replacement of the coils 35 and 36 can be handled by replacing the plastic cases 55 and 56, which allows the aluminum accommodating case 40 to be shared.

In addition, the plastic cases 55 and 56 may be independent for each of the coils 35 and 36, as described above; alternatively, one case may be partitioned into a plurality of accommodating sections, and the plurality of coils 35 and 36 may be accommodated in this single case. This can decrease the number of plastic cases and can further simplify the work of bonding the plastic cases.

Furthermore, since the common-mode coil 35, the normal-mode coil 36, and the smoothing capacitor 37 accommodated in the accommodating case 4 are electrically connected by the bus bar assembly 34A, the high-voltage-system components 30 can be simply connected by welding the connection terminals of the plurality of high-voltage-system components 30 to the bus bar assembly 34A. This therefore eliminates the need for ensuring an excessive space in the accommodating case 40, allowing the accommodating case 40 to be made compact. Furthermore, since the accommodating case 40 has the screw holes 49 and 50 and the mounting bosses (mounting surfaces) 47 and 48 for mounting the components to be accommodated, screw holes and mounting surfaces corresponding thereto can be omitted from the housing 2. This can reduce the risk of, for example, refrigerant leakage, will increase due to screw holes and mounting surfaces processed on the housing 2.

Furthermore, the peripheral surface of the accommodating case 40 is made flat without ribs and reduced-wall portions, so that the surface area is reduced as much as possible, and the peripheral surface is not subjected to shot blasting even though it is a die-cast product. By providing such a surface-area reducing part and/or a heat-input hindering part, heat input to the accommodating case 40 due to radiation or the like from the outside can be reduced as much as possible. This can further increase the cooling effect on the accommodating case 40. The outer surface may be subjected to polishing or cutting as the heat-input hindering part.

Furthermore, since the high-voltage-system components 30 accommodated in the accommodating case 40 and the inverter module 21 accommodated in the inverter accommodating section 9 are electrically connected through the relay bus bar 14, a change of the mounting position of the accommodating case 40 can easily be handled by replacing the relay bus bar 14. Accordingly, this can increase the flexibility of the mounting position of the accommodating case 40 relative to the housing 2, thus improving the ease of mounting on vehicles. In addition, the relay bus bar 14 is connected by welding, thus making it difficult to dismount it even without a special bolt.

Furthermore, since the high-voltage cables 31 and 32 are connected to the accommodating case 40 from the high-pressure portion of the housing 2 (the compressor housing 5 side) along the direction of the motor axis L, the high-voltage cables 31 and 32 can be wired in the direction of the motor axis L using the peripheral space of the high-pressure portion of the housing 2 in which the compression mechanism is accommodated. This can reduce a space necessary for mounting, which should be provided around the inverter-integrated electric compressor 1, thus improving the ease of mounting on vehicles.

The present invention is not limited to the present invention according to the embodiment described above, and modifications can be made as appropriate without departing from the spirit thereof. For example, in the above embodiment, the compression mechanism of the inverter-integrated electric compressor 1 may be any type of compression mechanism. Although an example in which the inverter accommodating section 9 is formed integrally with the housing (motor housing 4) 2 is described, the inverter accommodating section 9 may be separate from the housing 2 and may be mounted to the housing 2.

REFERENCE SIGNS LIST

1 inverter-integrated electric compressor
2 housing
3 electric motor
4 motor housing
5 compressor housing
8 suction port
9 inverter accommodating section (first accommodating section)
14 relay bus bar
16 mounting surface (flange surface)
17 O-ring
20 inverter
21 inverter module (inverter circuit section)
30 high-voltage-system components
31, 32 high-voltage cable
33 terminal block
34 high-voltage line
34A bus bar assembly (bus bar)
35 common-mode coil
36 normal-mode coil
37 smoothing capacitor
40 accommodating case (second accommodating section)
47, 48 mounting boss (mounting surface)
49, 50 screw hole
55, 56 plastic case
L motor axis

The invention claimed is:

1. An inverter-integrated electric compressor in which an inverter accommodating section is provided on the periphery of a housing accommodating an electric motor and a compression mechanism, and an inverter that converts DC power supplied from a high-voltage power supply to three-phase AC power and that supplies the three-phase AC power to the electric motor is provided therein, wherein the inverter accommodating section is divided into a first accommodating section accommodating an inverter module equipped with a power system board on which semiconductor switching devices are mounted and a CPU board on which a control and communication circuit are mounted; and a second accommodating section accommodating high-voltage-system components, including a common-mode coil, a normal-mode coil, and a smoothing capacitor, provided on a high-voltage line for supplying the DC power supplied from the high-voltage power supply to the inverter module, the accommodating sections being separately provided on the periphery of the housing, and the high-voltage-system components are for reducing common-mode noise, switching noise, and current ripples of the inverter, wherein in the first accommodating section a relay bus bar which electrically connects between the inverter module accommodated in the first accommodating section and the high-voltage-system components accommodated in the second accommodating section, the first accommodating section is mounted on the upper surface of the periphery of the housing, and the second accommodating section is mounted on the side surface of the periphery of the housing at the relay bus bar side with respect to an axis of the electric motor.

2. The inverter-integrated electric compressor according to claim 1 wherein, the first accommodating section is provided on the upper surface of the periphery of the housing, and the second accommodating section is provided on the side surface of the periphery of the housing.

3. The inverter-integrated electric compressor according to claim 1, wherein the first accommodating section is formed integrally with the housing.

4. The inverter-integrated electric compressor according to claim 1, wherein the second accommodating section is separate from the housing as an accommodating case for the high-voltage-system components and is integrally fixed on the periphery of the housing, with the high-voltage-system components accommodated therein.

5. An inverter-integrated electric compressor in which an inverter accommodating section is provided on the periphery of a housing accommodating an electric motor and a compression mechanism, and an inverter that converts DC power supplied from a high-voltage power supply to three-phase AC power and supplies the three-phase AC power to the electric motor is provided therein, wherein, in the inverter, high-voltage-system components, including a common-mode coil, a normal-mode coil, and a smoothing capacitor, provided on a high-voltage line for supplying the DC power from the high-voltage power supply to the inverter are accommodated in an accommodating case separate from the inverter accommodating section and equipped with a terminal block to which high-voltage cables are connected, and the accommodating case is fixed on the periphery of the housing as an assembly integrated with the high-voltage cables, and the high-voltage-system components are for reducing common-mode noise, switching noise, and current ripples of the inverter;

wherein in the first accommodating section a relay bus bar which electrically connects between the inverter module accommodated in the first accommodating section and the high-voltage-system components accommodated in the accommodating case, the first accommodating section is mounted on the upper surface of the periphery of the housing, and the accommodating case is mounted on the side surface of the periphery of the housing at the relay bus bar side with respect to an axis of the electric motor.

6. The inverter-integrated electric compressor according to claim 1, wherein the housing is formed in a cylindrical shape in which the compression mechanism is housed at the front side and the electric motor is housed at the rear side, the second accommodating section is mounted on the side surface of the periphery of the housing adjacent to a suction port which is mounted on a low-pressure side of the housing.

7. The inverter-integrated electric compressor according to claim 5, wherein the accommodating case is formed of aluminum, and the common-mode coil and the normal-mode coil are accommodated in the aluminum accommodating case with the use of a plastic case.

8. The inverter-integrated electric compressor according to claim 5, wherein the accommodating case is filled with silicone adhesive having a heat-dissipating property to both secure and insulate the high-voltage-system components.

9. The inverter-integrated electric compressor according to claim 5, wherein the plurality of high-voltage-system components accommodated in the accommodating case are electrically connected through a bus bar.

10. The inverter-integrated electric compressor according to claim 5, wherein the accommodating case has a screw hole and a mounting surface for mounting the components to be accommodated.

11. The inverter-integrated electric compressor according to claim 5, wherein the accommodating case is fixed on the side surface of the periphery of a low-pressure portion of the housing.

12. The inverter-integrated electric compressor according to claim 11, wherein the accommodating case is fixed to the side surface of the periphery of the low-pressure portion, having a suction port, of the housing.

13. The inverter-integrated electric compressor according to claim 12, wherein the accommodating case accommodates the common-mode coil and the normal-mode coil at a portion close to the suction port.

14. The inverter-integrated electric compressor according to claim 5, wherein the accommodating case is fixed on the fixing surface of the periphery of the housing with an O-ring therebetween, and with a metal-contact portion left thereon.

15. The inverter-integrated electric compressor according to claim 5, wherein the outer surface of the accommodating case is provided with a surface-area reducing part and/or heat-input hindering part.

16. The inverter-integrated electric compressor according to claim 5, wherein the high-voltage-system components accommodated in the accommodating case and the inverter accommodated in the inverter accommodating section are electrically connected through a relay bus bar.

17. The inverter-integrated electric compressor according to claim 5, wherein the high-voltage cables are connected to the accommodating case from a high-pressure portion of the housing along the direction of the motor axis.

18. The inverter-integrated electric compressor according to claim 5, wherein the housing is formed in a cylindrical shape in which the compression mechanism is housed at the front side and the electric motor is housed at the rear side, the accommodating case is mounted on the side surface of the periphery of the housing adjacent to a suction port which is mounted on a low-pressure side of the housing.

* * * * *